(12) United States Patent
Chmelar

(10) Patent No.: US 10,731,698 B2
(45) Date of Patent: Aug. 4, 2020

(54) HOOK DEVICE WITH ROTATABLE OPPOSING JAWS

(71) Applicant: Erik Vaclav Chmelar, Ann Arbor, MI (US)

(72) Inventor: Erik Vaclav Chmelar, Ann Arbor, MI (US)

(*) Notice: Subject to any disclaimer, the term of this patent is extended or adjusted under 35 U.S.C. 154(b) by 42 days.

(21) Appl. No.: 15/853,723

(22) Filed: Dec. 23, 2017

(65) Prior Publication Data

US 2018/0187713 A1    Jul. 5, 2018

Related U.S. Application Data

(60) Provisional application No. 62/441,409, filed on Jan. 1, 2017.

(51) Int. Cl.
| | |
|---|---|
| *F16B 45/06* | (2006.01) |
| *B60P 7/08* | (2006.01) |
| *F16B 2/10* | (2006.01) |
| *F16B 45/00* | (2006.01) |

(52) U.S. Cl.
CPC ............ *F16B 45/06* (2013.01); *B60P 7/0823* (2013.01); *F16B 2/10* (2013.01); *F16B 45/00* (2013.01)

(58) Field of Classification Search
CPC .......... B60P 7/0823; F16B 2/10; F16B 45/00; F16B 45/06
See application file for complete search history.

(56) References Cited

U.S. PATENT DOCUMENTS

| | | |
|---|---|---|
| 222,324 A | 12/1879 | Stapleton |
| 294,449 A | 3/1884 | Dat |
| 397,136 A | 2/1889 | McLean |
| 656,923 A | 8/1900 | Beard |
| 682,684 A | 9/1901 | Hakemeyer |
| 712,959 A | 11/1902 | Pohlman |
| 751,614 A * | 2/1904 | Cotten .................. F16G 15/02  24/376 |
| 827,206 A | 7/1906 | Billman |
| 878,274 A | 2/1908 | Clark et al. |
| 931,588 A | 8/1909 | Forstner |
| 955,070 A | 4/1910 | Honabach |
| 1,197,020 A | 9/1916 | Farrar |
| 1,262,974 A * | 4/1918 | Pearen .................. F16B 45/02  24/598.5 |
| 1,512,914 A | 10/1924 | Rees |
| 1,518,541 A * | 12/1924 | Nelson .................. B60C 27/08  24/577.1 |
| 1,584,307 A | 5/1926 | King |
| 1,637,699 A | 8/1927 | Samuel |

(Continued)

FOREIGN PATENT DOCUMENTS

| | | |
|---|---|---|
| DE | 3336115 A1 | 4/1985 |
| EP | 2347668 A1 | 7/2011 |

*Primary Examiner* — Robert Sandy
*Assistant Examiner* — David M Upchurch
(74) *Attorney, Agent, or Firm* — Erik Chmelar

(57) ABSTRACT

A clasp having a bushing and two hooks that face each other. Each hook has a bend, a shank, a sleeve that is rotatably coupled to the bushing, and ridges and grooves that engage with ridges and grooves on the other hook to latch the clasp in various positions. The bends contact each other along a plane of contact. The sleeve and bend of each hook are disposed on opposite sides of the plane of contact to bias the ridges and grooves towards each other.

17 Claims, 10 Drawing Sheets

(56) References Cited

U.S. PATENT DOCUMENTS

| | | |
|---|---|---|
| 1,686,424 A | 10/1928 | Malcolm |
| 2,128,804 A | 8/1938 | Donaldson |
| 2,731,695 A | 1/1956 | Valcourt |
| 2,761,190 A | 9/1956 | Saul |
| 2,795,024 A | 6/1957 | Donaldson |
| 2,874,435 A | 2/1959 | Nielsen |
| 3,002,242 A | 10/1961 | Donaldson |
| 3,072,987 A | 1/1963 | Winters |
| 3,128,520 A | 4/1964 | Herman et al. |
| 3,144,748 A * | 8/1964 | Knop .................... B60D 1/187 59/88 |
| 3,422,964 A | 1/1969 | Nadherny |
| 3,638,283 A | 2/1972 | Moretti |
| 3,956,804 A | 5/1976 | Gatof et al. |
| 3,982,307 A | 9/1976 | Smith et al. |
| 4,380,101 A | 4/1983 | Joubert et al. |
| 5,050,273 A | 9/1991 | Okura |
| 5,317,788 A | 6/1994 | Esposito et al. |
| 5,956,980 A | 9/1999 | Jenkins |
| 6,202,267 B1 | 3/2001 | Collins |
| 6,460,225 B1 | 10/2002 | Brault |
| 6,553,636 B1 * | 4/2003 | Brenner ................ A44C 5/2038 24/334 |
| 6,938,306 B2 | 9/2005 | Joubert et al. |
| 8,020,337 B1 * | 9/2011 | Batton .................. A01K 83/02 43/36 |
| 8,099,838 B2 | 1/2012 | Wang |
| 8,205,306 B2 * | 6/2012 | Kovach ................ A44B 19/262 24/429 |
| 9,249,825 B1 | 2/2016 | Cornay |
| 9,333,895 B2 | 5/2016 | Pingleton |
| 2004/0134118 A1 | 7/2004 | Miller et al. |
| 2007/0067968 A1 | 3/2007 | Krawczyk |
| 2009/0119891 A1 | 5/2009 | Leung |
| 2010/0024177 A1 * | 2/2010 | Hayes .................... F16B 45/00 24/588.1 |
| 2013/0232733 A1 | 9/2013 | Jacobson et al. |
| 2014/0053372 A1 | 2/2014 | Jacobson et al. |

* cited by examiner

HOOK DEVICE WITH ROTATABLE OPPOSING JAWS

CROSS-REFERENCE TO RELATED APPLICATIONS

This application is claims the benefit of provisional U.S. Pat. App. 62/441,409, filed Jan. 1, 2017. The disclosure of the prior application is incorporated herein by reference.

BACKGROUND OF THE INVENTION

The present invention relates to hooks that may be attached to cords, ropes, or webbing for trying, bundling, or securing objects. Example applications include bungee cords, tie-downs, tarp straps, cargo cords, and stretch cords (hereafter simply referred to as bungee cords, collectively, regardless of whether the cord is elastic or inelastic). A bungee cord is generally a segment of cord with a rigid hook on one or both ends. The cord may be made of any suitable material, for example rubber, polyurethane, thermoplastic, nylon, polypropylene, polyester, and so on. The hook may be made of any suitable material, for example metal and/or plastic, it may be stamped, cast, or molded, and it may have practically any shape, size, and strength.

The shank, gape, and throat of a hook determine the size and type of objects that can be grappled. For example, a hook having a shallow throat (a short bend) may have difficulty securely attaching around an object, but it may be easy to insert into a small-diameter hole. On the other hand, a hook having a deep throat (a long bend) may easily attach around an object, but at may be difficult or impossible insert into a small-diameter hole.

Many standard "S" and "C" hooks have deep throats, and are therefore not suntan for all applications. Consequently, some bungee cords have hooks that are specially shaped for certain applications. In contrast, some bungee cords have a generic fitting in place of a hook so that any hook that has a complementary fitting can be connected to the cord.

Sometimes the hooks of bungee cords may tangle with each other and with the cords when stored together in bin. To help prevent this, some bungee-cord designs permit the hooks to interlock or nest together for storage.

Many S and C hooks, as well as snap hooks and carabiners, do not provide an adequate grip to hold onto when stretching a bungee cord. A bungee cord that recoils when a user loses his grip may cause injury. Additionally, a user's finger may be pinched between a hook and an object if he pulls on the hook by curling his finger around it. Consequently, some hook designs have a pull tab on the shank that can be gripped with a finger.

Finally, a notable limitation of standard S and C hooks is that they may detach from an object due to slack in the cord, shifting of an object, or vibrations. Hooks such as carabiners and snap hooks address this limitation by providing a pivoting or sliding gate that creates an enclosed loop. The gate of such a hook may pivot within the plane of the hook inwardly or outwardly; the gate may pivot above or below the plane of the hook; or the gate may slide or translate. The gate may be biased by a spring, magnet, flexible member, and so on. The gate may be a stout straight member or the gate may resemble a hook itself, for example in clasps that comprise two opposing parallel contacting jaws that pivot about a shared joint.

Hook assemblies comprising parallel contacting opposing jaws may include one or more stop mechanisms to prevent one jaw from rotating beyond some angle relative to the other jaw. Such hook assemblies may also include one or more retention mechanisms to retain the hook assembly in a closed or opened position. A retention mechanism may be a bump or ridge on the surface of one jaw that engages with a dimple or notch on a surface of the other jaw.

Four issues of hook devices have been described above: (1) a hook having either too deep too shallow of a throat; (2) a hook tangling with cords and other hooks; (3) a hook lacking an adequate grip; and (4) a hook accidentally detaching from an object. This disclosure teaches an improved hook assembly that addresses one or more of these issues.

BRIEF SUMMARY OF THE INVENTION

This disclosure teaches a versatile hook assembly that may be used by itself as a hook, ring, or clasp, or it may be secured to and used in conjunction with rope, cord, webbing, shock cord, flat elastic, or chain to tie, strap, bundle, or secure objects. The hook assembly comprises two parallel opposing hooks (i.e., the opening of each hook faces the opening of the other hook). Each hook may rotate together or independently about a common pivot joint so that the hooks may be positioned at various angles with respect to each other, thereby forming various hook-assembly configurations. Several configurations include "closed," "crossed," "opened," and "straight." The hook assembly may have more or fewer configurations than those just mentioned.

The hook assembly may include a plurality of retaining elements (retainers), which retain the shank of one hook at some predetermined angle relative to the shank of the other hook, and which impede further independent rotation of the hooks. A retainer may be referred to as a detente, snap, receiver, acceptor, register, and so on. The retainers of the hook assembly may be defined on the shanks, on a yoke, on another adjacent member, or on a combination thereof. A shank is generally the part of a hook extending from the cord-attachment end of the hook to the base of the bend of the hook. A shank may be straight, as is common for C hooks, or may be curved, as is common for S hooks. Further, a shank may be narrow or wide relative to the gape of a hook. A bend is the generally bent or curved portion of a hook used for grappling or surrounding an object. A bend extends from the distal end of a shank (the base of the bend) to a tip of the hook.

A retainer may be any element that impedes the rotation of a hook at some predetermined angle relative to the other hook, to a yoke, or to another member. Examples of a retainer include a depression or dimple on a surface, a trough of a corrugation, a kink or bend or deformity of a member, or any combination thereof that may engage with a portion of a shank. Alternatively, a retainer may be an elevation or bump on a surface, a peak of a corrugation, a kink or bend or deformity of a member, or any combination thereof that may engage with a depression or kink of a shank of a hook.

A retainer may be biased by a spring or any force not parallel to the plane of rotation. Retainers may have different retention forces. A user may overcome a retention force by applying sufficient force to a relevant hook along its path of rotation.

A configuration in which the hooks are retained in place relative to each other, such as the closed configuration of the illustrated embodiments, may be called a retained configuration. On the other hand, a configuration in which the hooks are not retained in place relative to each other, such as the opened configuration of the illustrated embodiments, may be called a non-retained configuration.

A "closed" configuration is where the bends of the hooks superimpose each other over or overlay) to create a substantially closed loop. This may look like a teardrop when viewed from above or below the plane of rotation. The closed configuration is useful for enclosing the hook assembly around an object or for storage of the hook assembly.

An "opened" configuration is where the angle between the shanks of the hooks is increased from that of the closed configuration to create a separation between the bends and between the tips of the hooks. This may look like a heart when viewed from above or below the plane of rotation. The hook assembly may be in the opened configuration just prior to enclosing around an object. In one embodiment, the hooks may not rotate beyond the opened configuration. In another embodiment, the hooks may rotate beyond the opened configuration.

A "straight" configuration is where the angle between the shanks is increased from that of the opened configuration to further increase the separation between the bends and between the tips. This may look like a wide letter U or W when viewed from above or below the plane of rotation. The straight configuration may be used to create double-ended hook for hanging objects.

Finally, a "crossed" configuration is where the angle between the distal portions of the shanks is decreased from that of the closed configuration to be adjacent and generally parallel to each other. This may look like a grappling hook or an umbrella when viewed from above or below the plane of rotation. The hook assembly may be in the crossed configuration when a user wants to have a pull tab, or, if one of the hooks has a shallow throat, to secure the shallow-throated hook within a small hole. In one embodiment, the hooks may not rotate beyond the crossed configuration. In another embodiment, the hooks may rotate beyond the crossed configuration.

DETAILED DESCRIPTION OF THE INVENTION

Figure 1A:
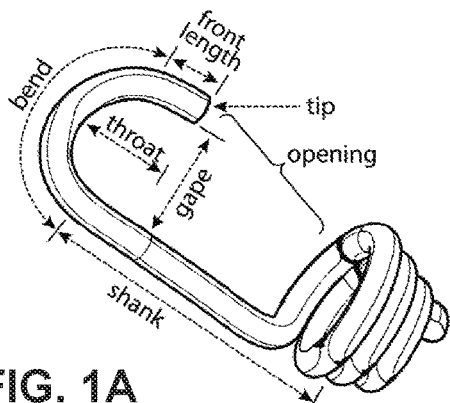
FIG. 1A shows a perspective view of a standard C hook and FIG. 1B shows a perspective view of a standard S hook.
Figure 1B:
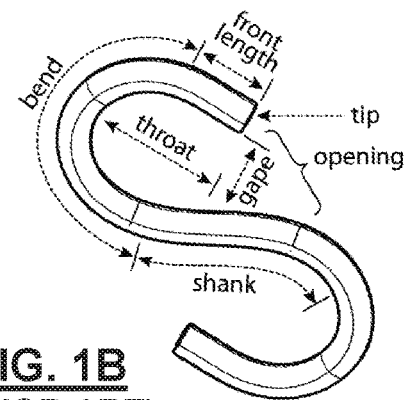

The following numerals are used to identify the corresponding elements in the figures for the several embodiments. 200-level numbers refer to elements on or associated with the deep hook; 300-level numbers refer to elements on or associated with the shallow hook; 400-level numbers refer to elements on or associated with a yoke; 500-level numbers refer to elements on or associated with a cord.
- 100 hook assembly
- 200 deep hook
- 210 sleeve
- 220 retainer for closed position
- 230 retainer for crossed position
- 240 embossment
- 250 protrusion
- 260 separation
- 270 arm
- 280 hole
- 300 shallow hook
- 310 sleeve
- 320 retainer for closed position
- 330 retainer for crossed position
- 340 embossment
- 350 protrusion
- 360 separation
- 370 arm
- 380 hole
- 400 yoke
- 410 bushing
- 420 bore
- 500 cord FIG. 1A shows a standard C hook and FIG. 1B shows a standard S hook with various parts of each hook labeled. A shank is generally the part of a hook between a grappling end (comprising a bend and a tip) and a cord-attachment end (where a cord may be connected). A hook may include a front length between the bend and the tip. Parts of the hook nearer to the cord-connection end are "proximal" thereto and parts of the hook further from the cord-connection end are "distal" thereto.

The gape is the distance between the base of the bend (the proximal end of the bend corresponding to the distal end of the shank) and the tip. The throat is approximately the distance between a medial point of the bend and a medial point of a line projected from the base of the bend to the tip. A deep throat corresponds to a large distance and a shallow throat corresponds to a small distance. The opening is approximately the distance between a proximal end of the shank and the tip. In this disclosure the terms "hook" and "jaw" are used interchangeably to describe rigid member having a shank, a bend, a throat, and a gape.

Figure 2A:
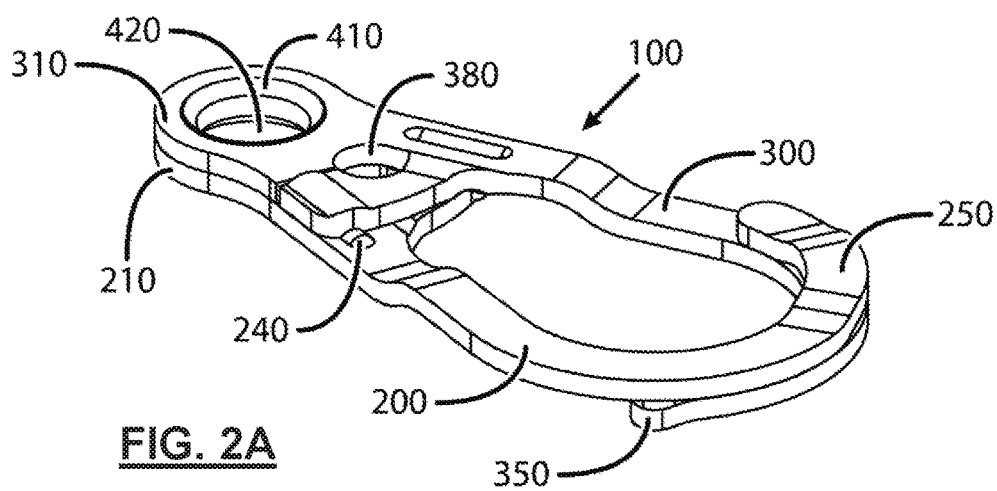
FIGS. 2A-2D show perspective views of a first embodiment in closed, crossed, opened, and straight configurations, respectively.
Figure 6A:
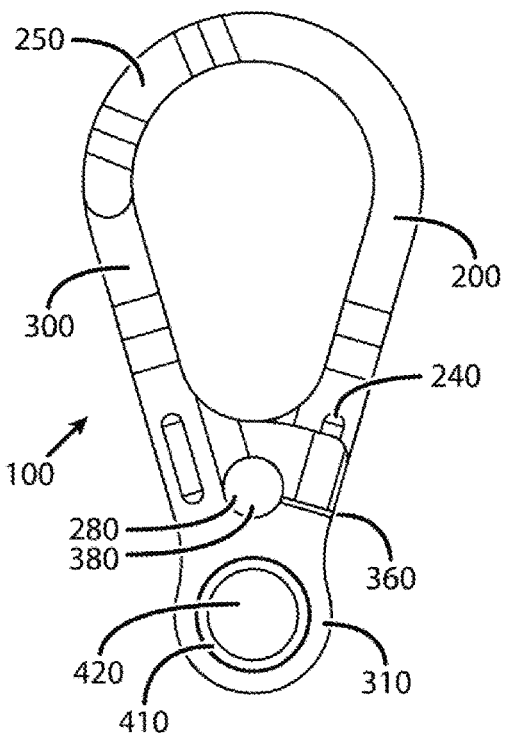
FIGS. 6A-6D show top planar views of the first embodiment in closed, crossed, opened, and straight configurations, respectively.

FIGS. 2A and 6A show a first embodiment of the hook assembly 100 in a closed configuration. The hook assembly 100 comprises a pair of parallel opposing hooks, referred to as deep hook 200 and shallow hook 300, each secured to a bushing 410 to form two coaxial planar pivot joints. Despite the "deep" and "shallow" labels given to the hooks in this disclosure, the hooks may have throats of equal or unequal depths; they may have gapes of equal or unequal sizes; and they may have shanks of equal or unequal lengths.

The bushing 410 may comprise one or more discrete components; or it may be integrally formed from the deep hook 200, the shallow hook 300, and/or an optional yoke 400 (a yoke 400 is shown in FIGS. 10-13); or it may be comprise a combination thereof. For example, the deep hook 200 may have a solid or hollow extrusion that is received by a sleeve of the shallow hook 300 (or vice versa), wherein such extrusion may be engaged directly with the receiving sleeve or wherein the extrusion may pass through a receiving sleeve and snap, thread, or otherwise mate with fastening component. The bushing 410 may be made of any suitable material such as metal and/or plastic. The bushing 410 may be solid, such as a pin, rivet, post, bearing, axle, or extrusion, or the bushing 410 may be hollow (having a hole 420), such as a hollow rivet, hollow post, bearing, axle, grommet, or eyelet.

Figure 3A:
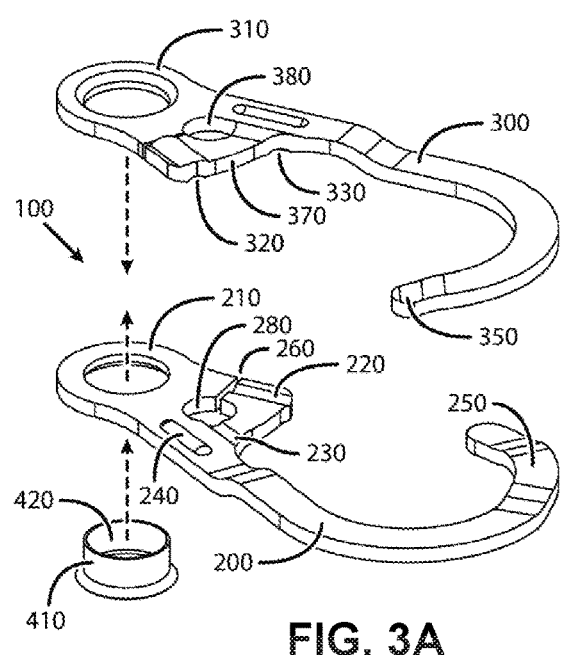
FIGS. 3A-3B show exploded perspective views of the first embodiment.
Figure 3B:
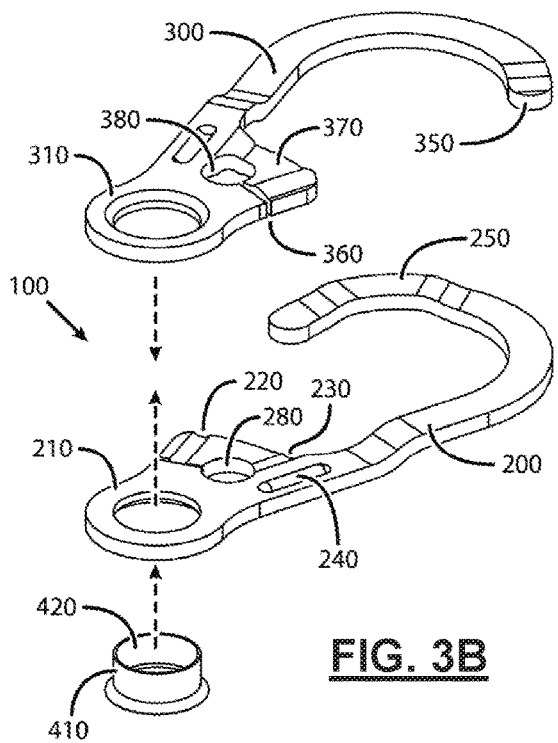

FIGS. 3A and 3B show exploded views of the hook assembly 100 before assembly. In FIGS. 3A and 3B (and FIGS. 11 and 13), the bushing 410 is shown having one end flared out before assembly such that the other end would be flared out after the bushing 410 has been fully inserted through the sleeve 210 of the deep hook 200 and the sleeve 310 of the shallow hook 300. Alternatively, flaring out of both ends of bushing 410 could be accomplished after assembly. Flaring out the ends of the bushing 410 is an exemplary means to engage the bushing 410 with the sleeve 210 and sleeve 310.

Figure 4:
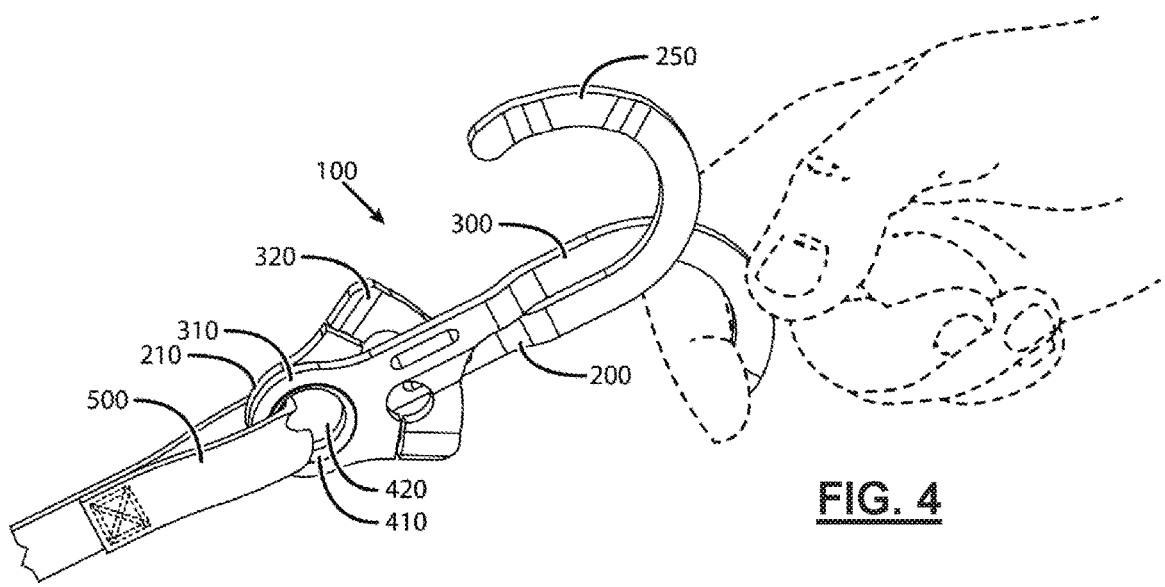
FIG. 4 shows a first hook of the first embodiment in a crossed configuration being used as a pull tab for a finger.

A cord 500 may be inserted through the bore 420, formed into a loop, and sewn, stapled, riveted, or otherwise temporarily secured or permanently fastened to itself. FIG. 4 shows the cord 500 passed through the bore 420 and sewn to itself. Alternatively, the cord 500 may be inserted through the bore 420 and then tied into a knot or secured to an arbitrarily shaped anchor having a diameter (or major and/or minor axes) larger than a diameter of the bore 420.

The bushing 410 and the sleeve 210 comprise a first pivot joint and the bushing 410 and the sleeve 310 comprise a second pivot joint coaxial with the first pivot joint. Thus, the deep hook 200 and the shallow hook 300 may rotate in parallel planes. This rotation allows the hook assembly 100 to assume a plurality of substantially planar configurations, for example "crossed," "crossed," "opened," and "straight."

The hook assembly 100 may include one or more retaining elements (retainers), each of which may engage with a portion of the shank of the deep hook 200 or with a portion of the shank of the shallow hook 300, or engage with a portion of a yoke 400. Such engagement may cause the engaged hook to latch, snap, catch, clip, or hold to the other hook or to a yoke such that the engaged hook is impeded from rotating relative to the other hook or to the yoke, respectively. Such an impeded rotational state may be referred to as a retained configuration of the hook assembly 100.

The exemplary illustrations of this disclosure depict the retainers as depressions on a flat surface of a hook, and they further illustrate the portions of the shank with which the retainers engage as embossments on a flat surface of a hook. This has been done for the sake of clarity not to limit the scope of the invention. First, a retainer may be any depressed or raised element on a surface that is capable of engaging with a complementary element on a shank of a hook. Second, the honks need not have flat surfaces, for example if they are formed from round wire. In such case, a retainer may simply be a kink or bend along the shank of a hook that is capable of engaging with a complementary kink or bend along the shank of the other hook, engaging with the crown of a curved surface along the shank of the other hook, or engaging with a complementary element on a yoke.

Figure 5A:
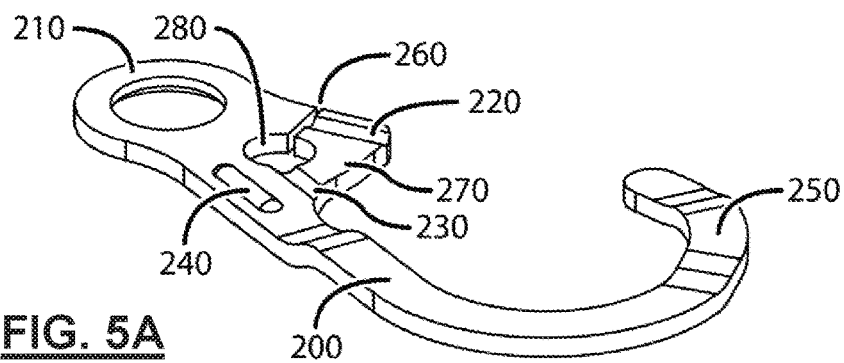
FIGS. 5A-5B show perspective views of the long and short hooks of the first embodiment, respectively.
Figure 5B:
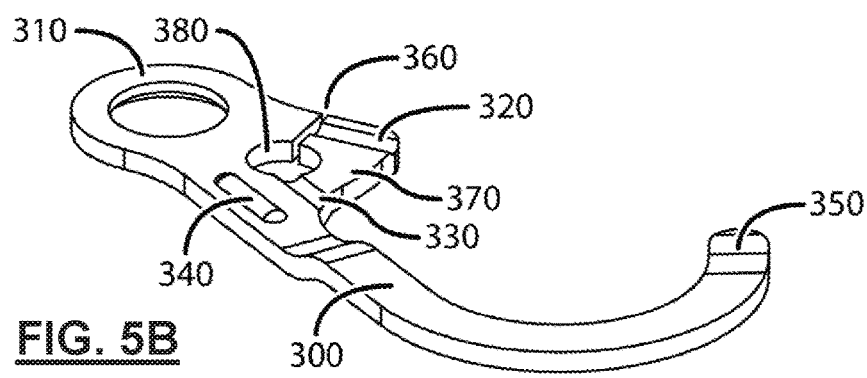

FIG. 5A shows the deep hook 200 having an embossment 240, a retainer for closed position 220, and a retainer for crossed position 230. Similarly, FIG. 5B shows the shallow hook 300 having an embossment 340, a retainer for closed position 320, and a retainer for crossed position 330. An embossment may be a portion of material extending from a surface, for example a bump on a flat surface, an edge of a flat surface that has been bent out of the plane of the surface, or a crown of a curved shank.

The specific number of embossments and retainers may be increased or decreased depending on the number of desired retained configurations. For example, each hook may include a third retainer that could latch the hook assembly 100 in the opened configuration. The retainers and embossments are substantially interchangeable. For example, a hook assembly of two hooks each having one embossment and two retainers has approximately the same functionality as a hook assembly of two hooks each having two embossments and one retainer (except possibly a reduced functionality with respect to undesired crossing-over of the hooks, as is later described). Additionally, the specific number of embossments and retainers may be increased or decreased depending on the desired absolute or relative retention strength for the various retained configurations.

In the closed configuration shown in FIGS. 2A and 6A, the embossment 240 defined on the deep hook 200 is engaged with the retainer for closed position 320 defined on the shallow hook 300. Similarly, the embossment 340 defined on the shallow hook 300 is engaged with the retainer for closed position 220 defined on the deep hook 200. This latter engagement is shown in cartoon form in FIG. 7A. Engagement of an embossment with a retainer creates an impediment (or resistance) of the deep hook 200 and the shallow hook 300 to rotate relative to each other, thereby latching the hook assembly 100 in this closed configuration until a user applies enough force to overcome the retention (engagement) force.

If the pivot hinges formed by the bushing 410, the sleeve 210, and the sleeve 310 have so much out-of-plane play that the deep hook 200 and the shallow hook 300 do not adequately contact each other, the embossments and retainers may not properly engage. For example, as viewed from the perspective shown in FIGS. 2A and 2B, if the deep hook 200 were to be permitted to move downwards away from the plane of the shallow hook 300, the embossment 240 may not engage with the retainer for closed position 320 or with the retainer for crossed position 330. One way to ensure proper engagement is to create a bias, substantially perpendicular to the planes of rotation, which pushes the embossments and retainers against each other. Two methods are described below.

Figure 2B:
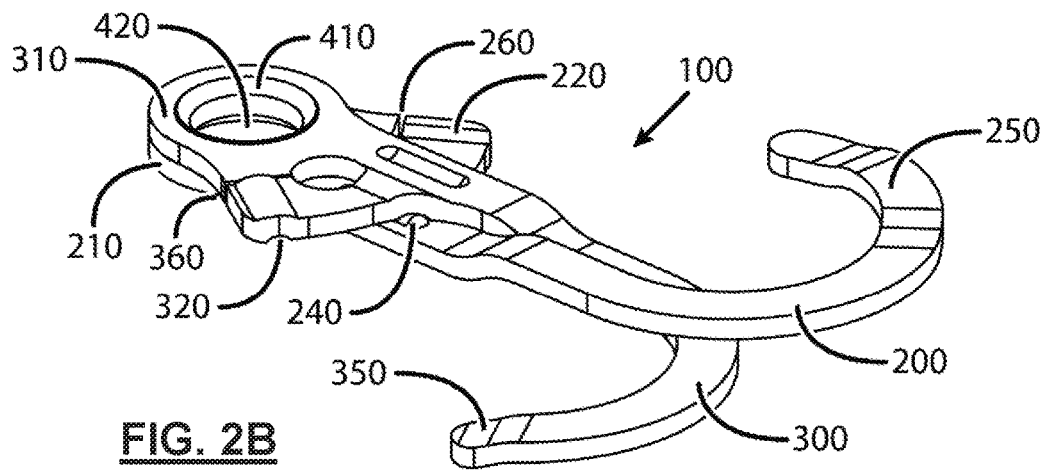

As shown in FIGS. 2A and 2B, the sleeve 210 of the deep hook 200 is disposed below and against the sleeve 310 of the shallow hook 300, but the bend of the deep hook 200 is disposed above and against the bend of the shallow hook 300. Thus, the bend of the shallow hook 300 may guide or push the bend and shank of the deep hook 200 upward (and equivalently the bend of the deep hook 200 may guide or push the bend and shank of the shallow hook 300 downward). Consequently, the embossment 240 may be biased upwards and the retainer for closed position 320 and the retainer for crossed position 330 bay be biased downwards (embossments and retainers may be biased towards each other).

A second means to bias the embossments and retainers towards each other can be seen with reference to FIGS. 5A and 5B. A separation 260 is defined on the wide portion of the shank of the deep hook 200, thereby forming an arm 270 on which the retainer for closed position 220 and the retainer for crossed position 230 are defined. Similarly a separation 360 is defined on the wide portion of the shank of the shallow hook 300, thereby forming an arm 370 on which the retainer for closed position 320 and the retainer for crossed position 330 are defined. The arm 270 and arm 370 may be bent slightly out of their respective planes of rotation towards each other (when assembled together as a hook assembly 100) and therefore press against each other. For example, as viewed from the perspective of FIG. 2C, the arm 370 could be bent slightly downward such that when the hook assembly 100 transitions to the closed configuration, the retainer for closed position 320 and the embossment 240 will push against each other and properly engage. A user may adjust the retention forces by manually bending the arm 270 and/or the arm 370.

Figure 2C:
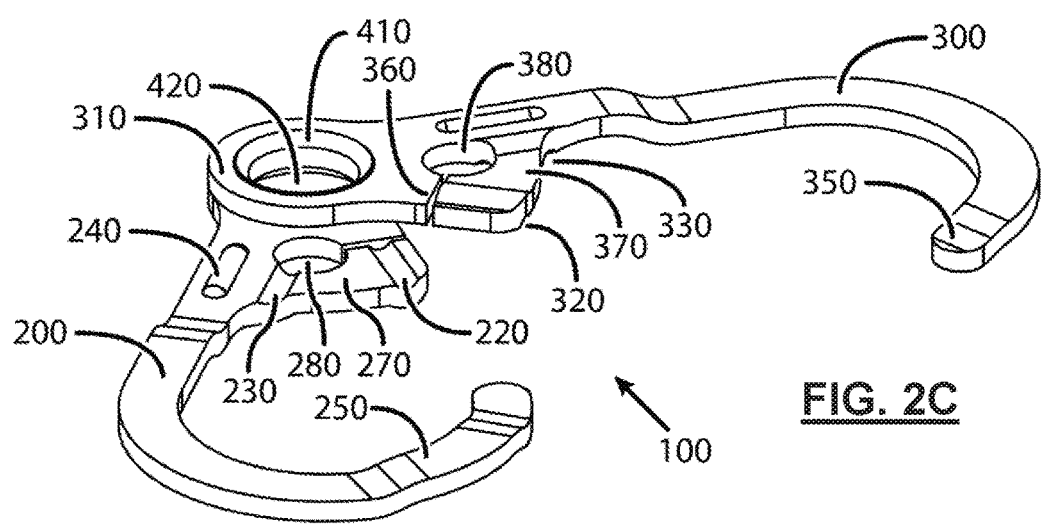

The deep hook 200 may include a hole 280 and the shallow hook 300 may include a hole 380, as shown in FIG. 2C, such that when the hook assembly 100 is in the closed configuration, as shown in FIGS. 2A and 6A, the hole 280 and the hole 380 substantially overlap (coincide). Such overlap enables the deep hook 200 and the shallow hook 300 to be locked together, for example by inserting a rigid object like a bolt through the hole 280 and the hole 380, or by inserting a wire through the hole 280 and the hole 380 and then wrapping the wire around the pair of the arm 270 and arm 370. Note that if locking is a desired function of an embodiment and a wire is intended to be used to accomplished such locking, the separation 260 and/or the separation 360 should be narrower than the diameter of the intended wire to ensure the locking mechanism cannot be too easily circumvented.

Figure 6B:
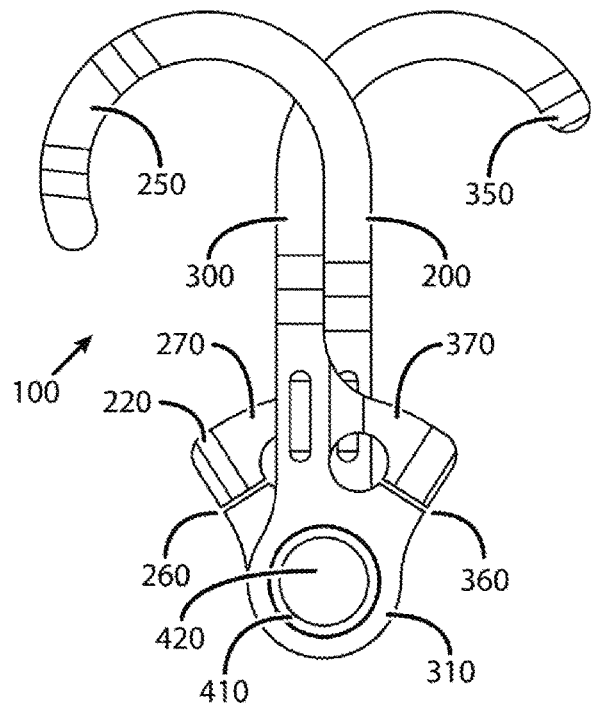

The crossed configuration shown in FIGS. 2B and 6B may be achieved by rotating the deep hook 200 and the shallow hook 300 towards each other when starting from the closed configuration shown in FIGS. 2A and 6A. In the crossed configuration, the embossment 240 defined on the deep hook 200 is engaged with a retainer for crossed position 330 defined on the shallow hook 300. Similarly, the embossment 340 defined on the shallow hook 300 is engaged with a retainer for crossed position 230 defined on the deep hook 200. This latter engagement is shown in cartoon form in FIG. 7C. These engagements create a resistance of the deep hook 200 and the shallow hook 300 to rotate relative to each other, thereby latching the hook assembly 100 in this crossed configuration until a user applies enough force to overcome the retention (engagement) force.

The crossed configuration provides several benefits. FIG. 4 shows how a user can use the shallow hook 300 as a pull tab when securing the deep hook 200 to an object (or vice versa).

Figure 6C:
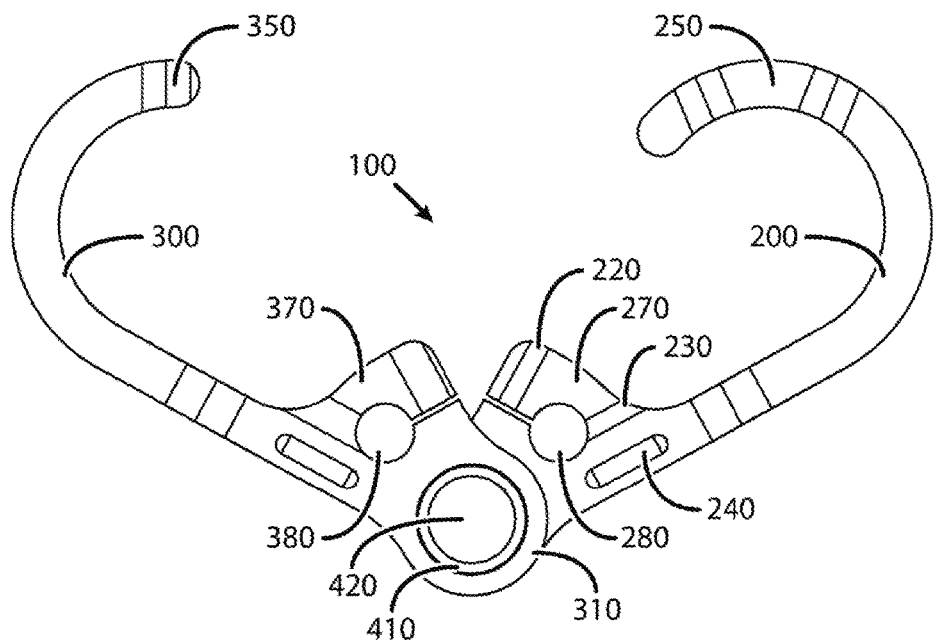

The opened configuration shown in FIGS. 2C and 6C may be achieved by rotating the deep hook 200 and the shallow hook 300 away from each other starting from the closed configuration shown in FIGS. 2A and 6A. In this first embodiment, there is no engagement of embossments and retainers in the opened configuration. Thus, the deep hook 200 and the shallow hook 300 may rotate relative to each other without having to overcome any retention force.

Figure 2D:
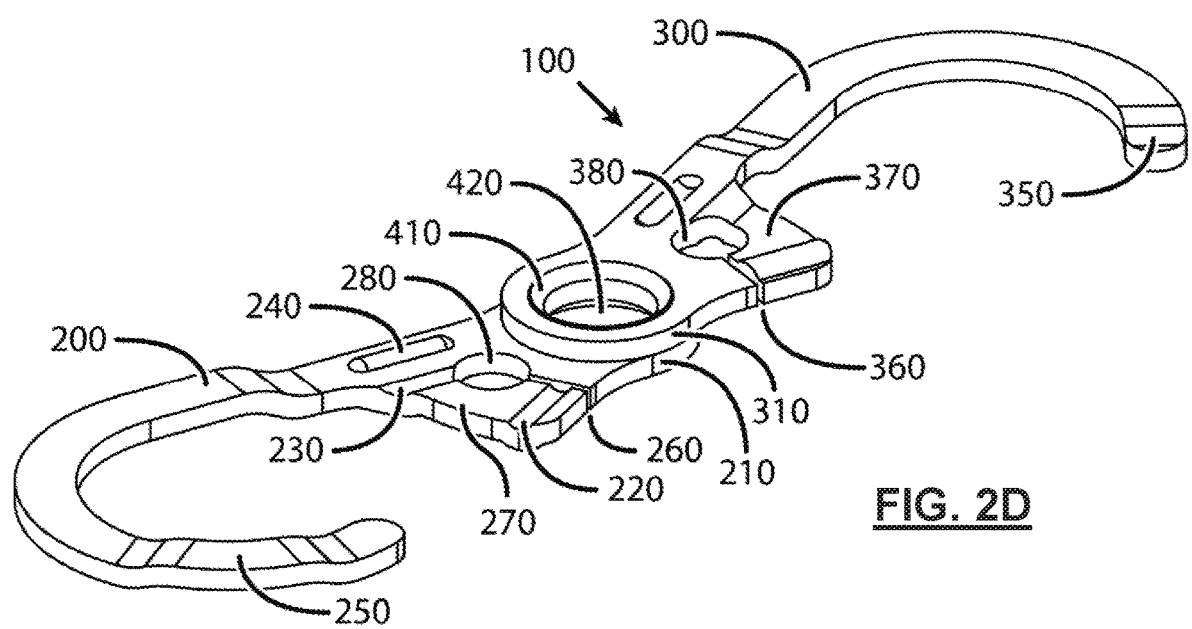
Figure 6D:
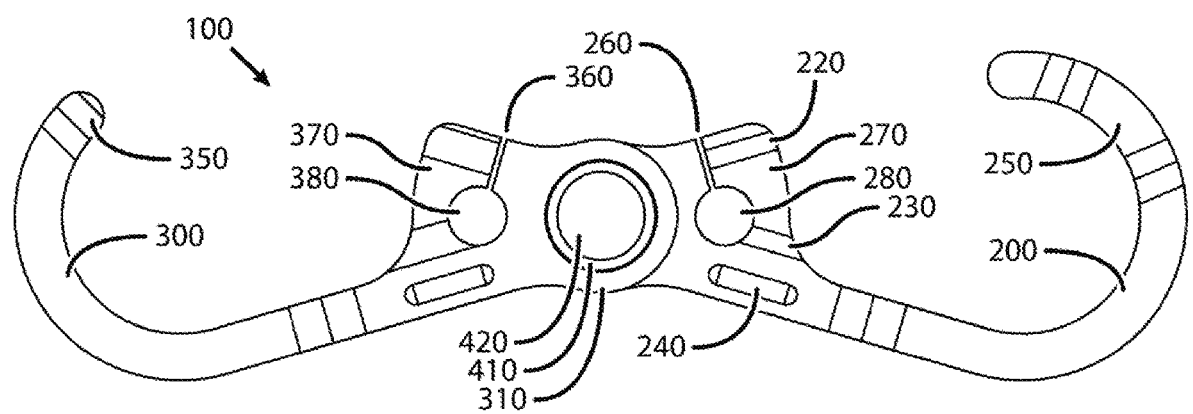

The straight configuration of FIGS. 2D and 6D may be achieved by rotating the deep hook 200 and shallow hook 300 away from each other starting from the opened configuration shown in FIGS. 2C and 6C. In this first embodiment, there is no engagement of embossments and retainers in the straight configuration. Thus, the deep hook 200 and the shallow hook 300 may rotate relative to each other without having to overcome any retention force.

Retention force is a function of the height of an embossment and the steepness of its sidewalls, and the depth of a retainer and the steepness of its sidewalls (among other parameters). A small retention force (small resistance to rotation) may be created with a short embossment and/or a shallow retainer, whereas as a large retention force (large resistance to rotation) may be created with a tall embossment and/or a deep retainer.

Figure 7A:
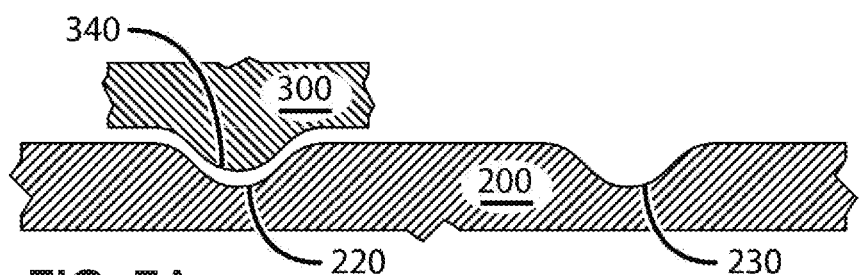
FIGS. 7A-7C show cartoon representations of an embossment on a hook disposed at various positions relative to several retainers.
Figure 7B:
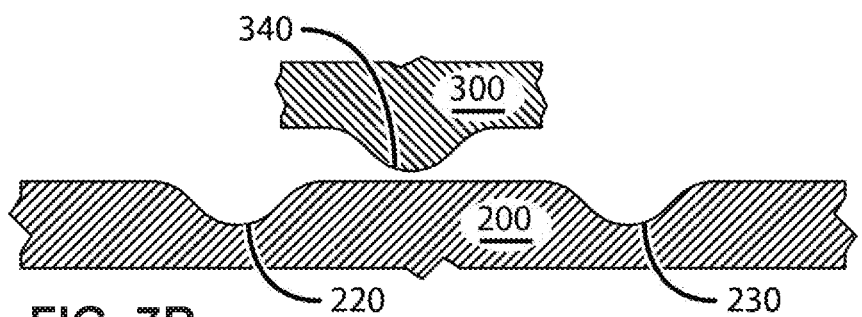
Figure 7C:
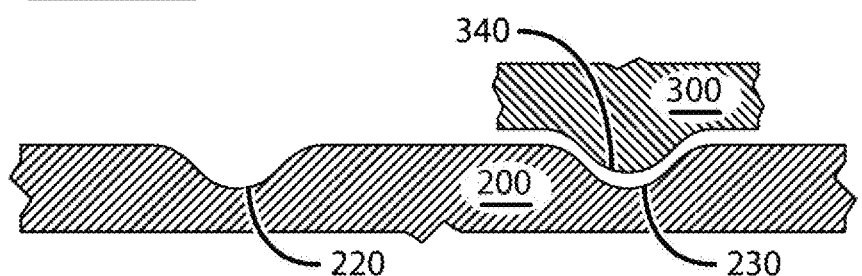

FIG. 7A shows the embossment 340 engaged with the retainer for closed position 220, which latches the deep hook 200 to the shallow hook 300. In FIG. 7E, a user has applied enough force to push the embossment 340 out of the retainer for closed position 220, causing the deep hook 200 and the shallow hook 300 to push away from each other out of their respective planes of rotation. When the embossment 340 is positioned adjacent to the retainer for crossed position 230, the embossment 340 "snaps" into the retainer for crossed position 230, thereby latching the deep hook 200 to the shallow hook 300 in the crossed configuration.

The exemplary illustrations of this disclosure show substantially symmetric (mirror image) shanks of the deep hook 200 and the shallow hook 300. This has been done for the sake of clarity not to limit the scope of the invention. The several embodiments of the hook assembly 100 would still be able to retain the closed and crossed configurations if the two retainers on one hook and the one embossment on the other hook were eliminated. For example, eliminating the retainer for closed position 220, the retainer for crossed position 230, and the embossment 340 would not sacrifice retention of either the closed or crossed configurations. This is because the retainer for closed position 320, the retainer for crossed position 330, and the embossment 240 would still be able to retain the deep hook 200 and shallow hook 300 in those configurations.

Figure 8:
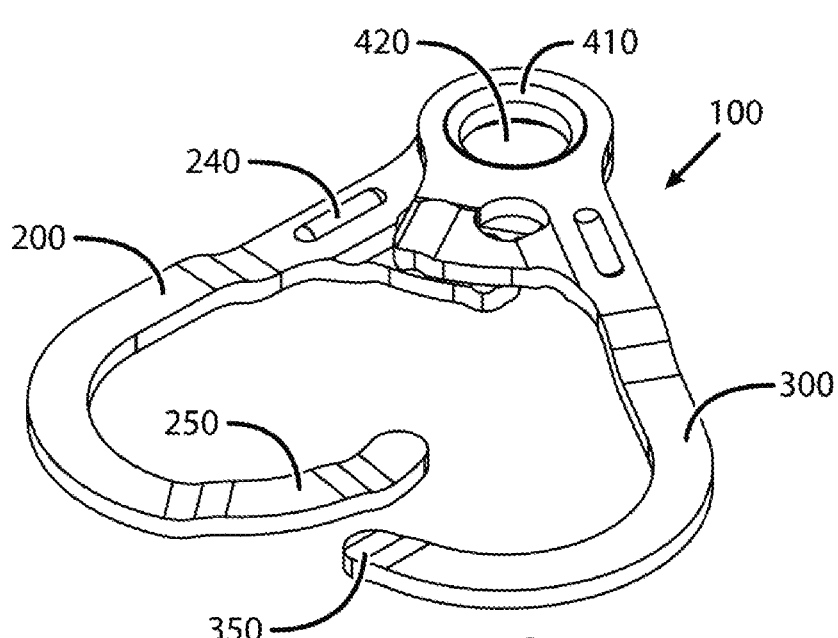
FIG. 8 shows a perspective view of the first embodiment in an intermediate configuration.

FIG. 8 shows the hook assembly 100 wherein the deep hook 200 and shallow hook 300 are rotating towards each other from the opened configuration to the closed configuration. In normal operation, the tip of the shallow hook 300 would pass under the bend of the deep hook 200 as viewed from this perspective. However, if there is a lot of out-of-plane play in the pivot hinges formed by the bushing 410, or if a user forces the deep hook 200 downward and/or forces the shallow hook 300 upward, the tip of the shallow hook 300 may pass over the bend of the deep hook 200. To prevent this undesired crossing-over of the hook assembly 100, the bend of the deep hook 200 defines a protrusion 250 that is displaced away from the plane of rotation of the shallow hook 300, thereby creating a void adjacent to the tip of the shallow hook 300. Similarly, the tip of the shallow hook 300 defines a protrusion 350 that is displaced away from the plane of rotation of the deep hook 200, thereby creating a void adjacent to the bend of the deep hook 200. These voids provide a margin of error when the bends and/or tips of the hooks rotate towards and past each other.

Undesired crossing-over of the hook assembly 100 can be exacerbated by the location of embossments and retainers. For example, the hook assembly 100 of the first embodiment would have approximately the same functionality if each embossment were instead a retainer and each retainer were instead an embossment (two embossments and one retainer per hook, for example). However, if the hooks of this hypothetical hook assembly were rotated from the opened configuration towards the closed configuration, the embossments on the opposite hooks would encounter each other and would cause the bend of each hook to deviate out of its normal plane rotation and into the plane of the bend of the other hook. If such encounter occurs before the tip of the shallow hook 300 rotates past the bend of the deep hook 200, the tip of the shallow hook 300 may strike the sidewall of the bend of the deep hook 200 or it may cross over the wrong surface of the bend of the deep hook 200. If this hypothetical hook assembly were viewed from the perspective shown in FIG. 8 (but this hypothetical hook assembly is not actually illustrated in FIG. 8), the tip of the shallow hook 300 would deviate upwards and the bend of the deep hook 200 would deviate downwards. This would cause a partial or complete loss of proper engagement of embossments and retainers in the closed and/or crossed configurations.

Figure 9A:
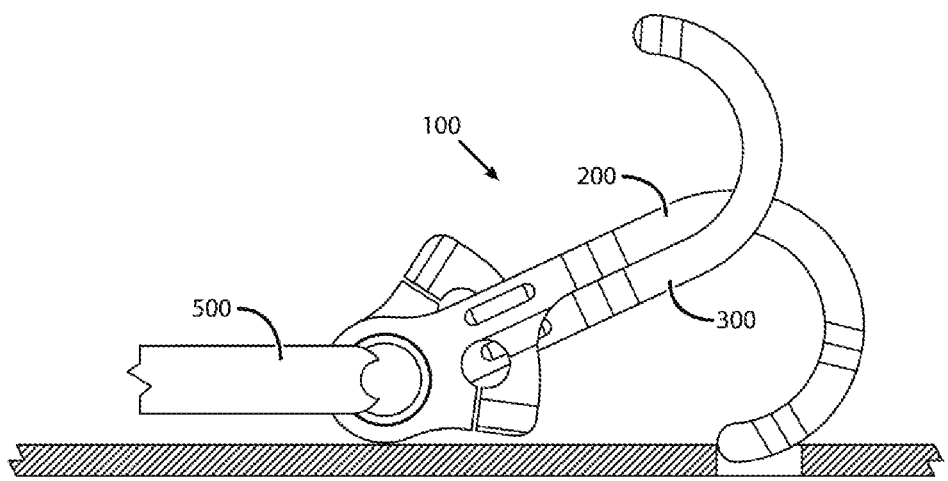
FIG. 9A shows a first (long) hook having a deep throat that is unable to be inserted into a small hole and FIGS. 9B-9C show a second (short) hook having a shallow throat that is able to be inserted into the small hole.
Figure 9B:
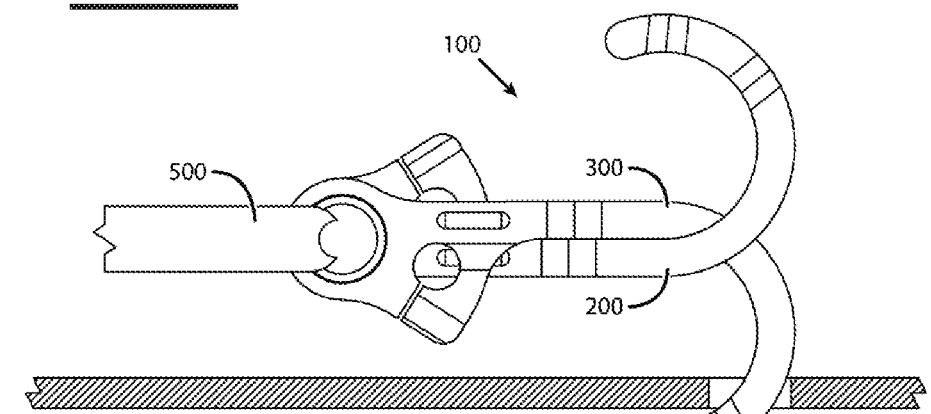
Figure 9C:
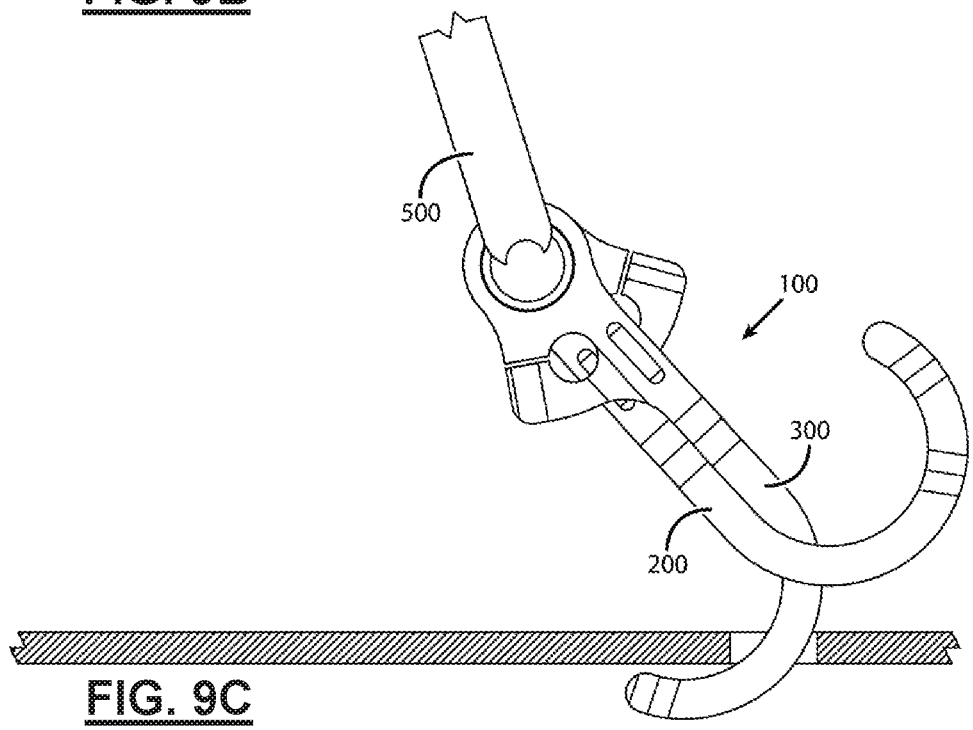

FIGS. 9A-9C demonstrate a benefit of the hook assembly 100 having a short hook 300 with a reduced throat depth. Many commercially available hooks are made with deep throats so that they can securely attach to objects. However, it can be difficult or impossible to insert a hook with a deep throat into a narrow slot or hole. Because the hook assembly 100 comprises two hooks, it can provide a deep hook 200 with a deep throat for securely attaching to objects and a shallow hook 300 with a shallow throat for insertion into narrow slots or holes. FIG. 9A shows a hole that is too narrow for the deep hook 200 to be inserted therein. However, FIGS. 9B and 9C show how the shallow hook 300 can be easily inserted into the same narrow hole.

Figure 10:
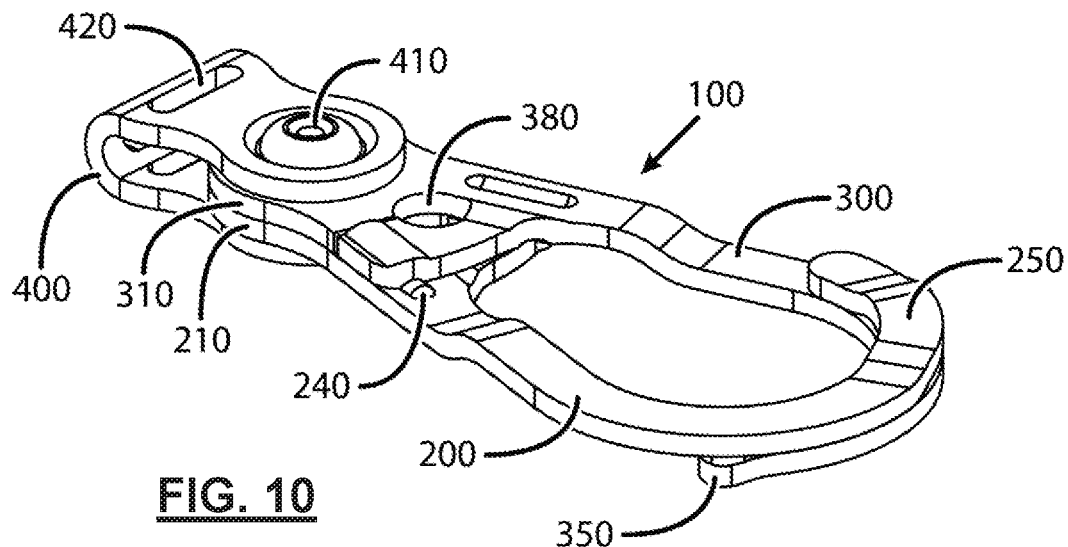
FIG. 10 shows a perspective view of a second embodiment in a closed configuration.
Figure 11:
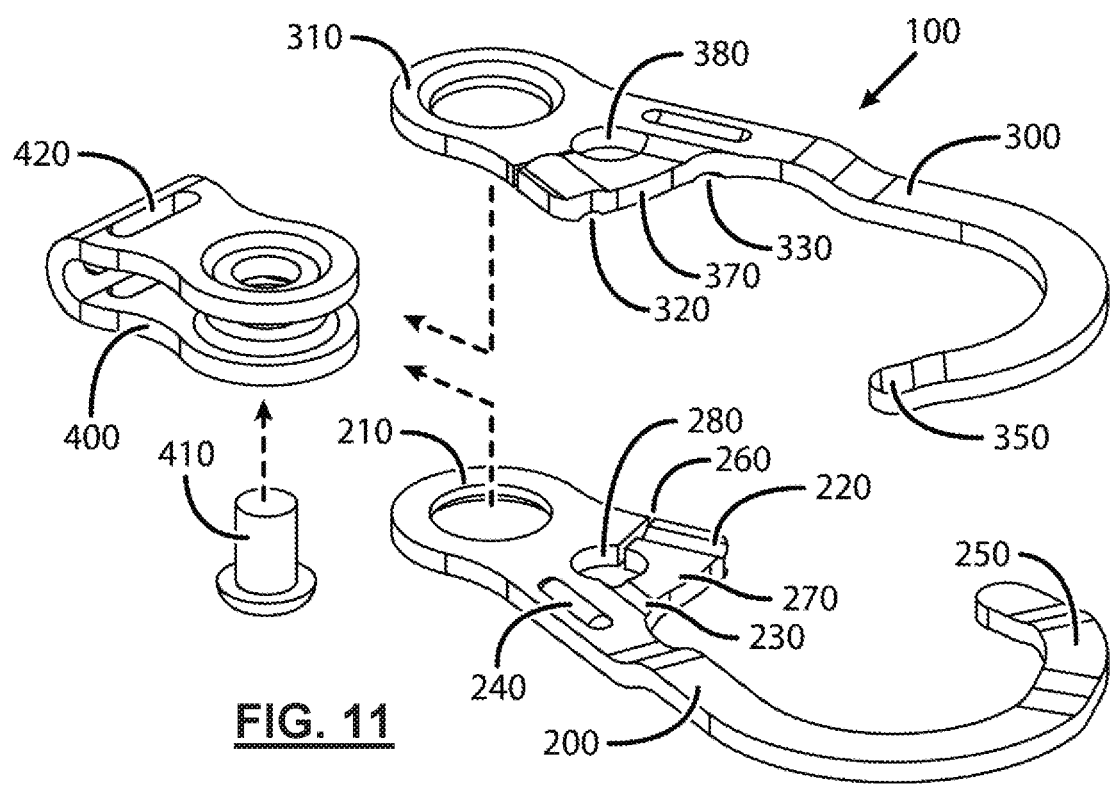
FIG. 11 shows an exploded perspective view of the second embodiment.

FIG. 10 shows a second embodiment of the hook assembly 100 that includes a yoke 400 that is secured to the deep hook 200 and to the shallow hook 300 by a bushing 410. FIG. 11 shows an exploded view of the hook assembly 100 before assembly. The bushing 410 may be a discrete component or it may be integrally formed onto the deep hook 200, the shallow hook 300, and/or the yoke 400. The outside diameter of the bushing 410 may be less than the inside diameters of the sleeve 210 and the sleeve 310 (as is illustrated) or it may be substantially the equal thereto. Similar to the first embodiment, the bushing 410 may be solid or hollow. If the bushing 410 is solid (as illustrated), the yoke 400 may include one or more holes 420 to receive a cord 500.

Figure 12:
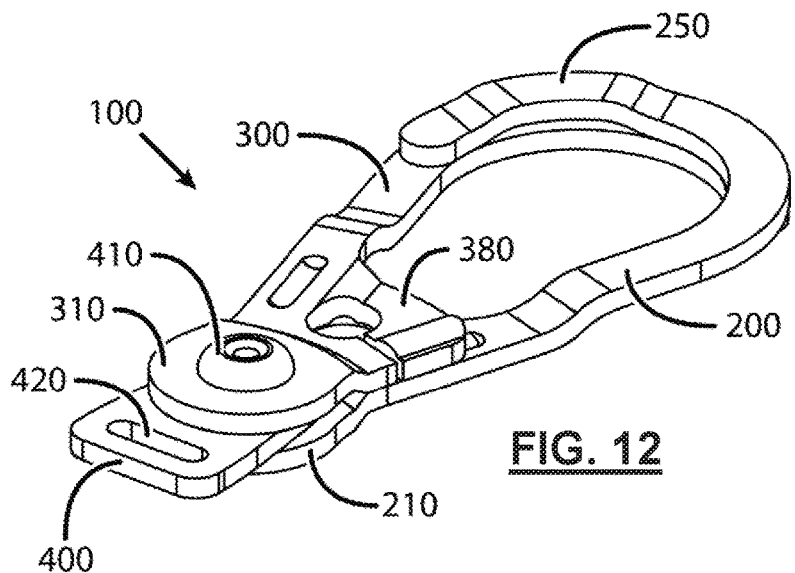
FIG. 12 shows a perspective view of a third embodiment in a closed configuration.
Figure 13:
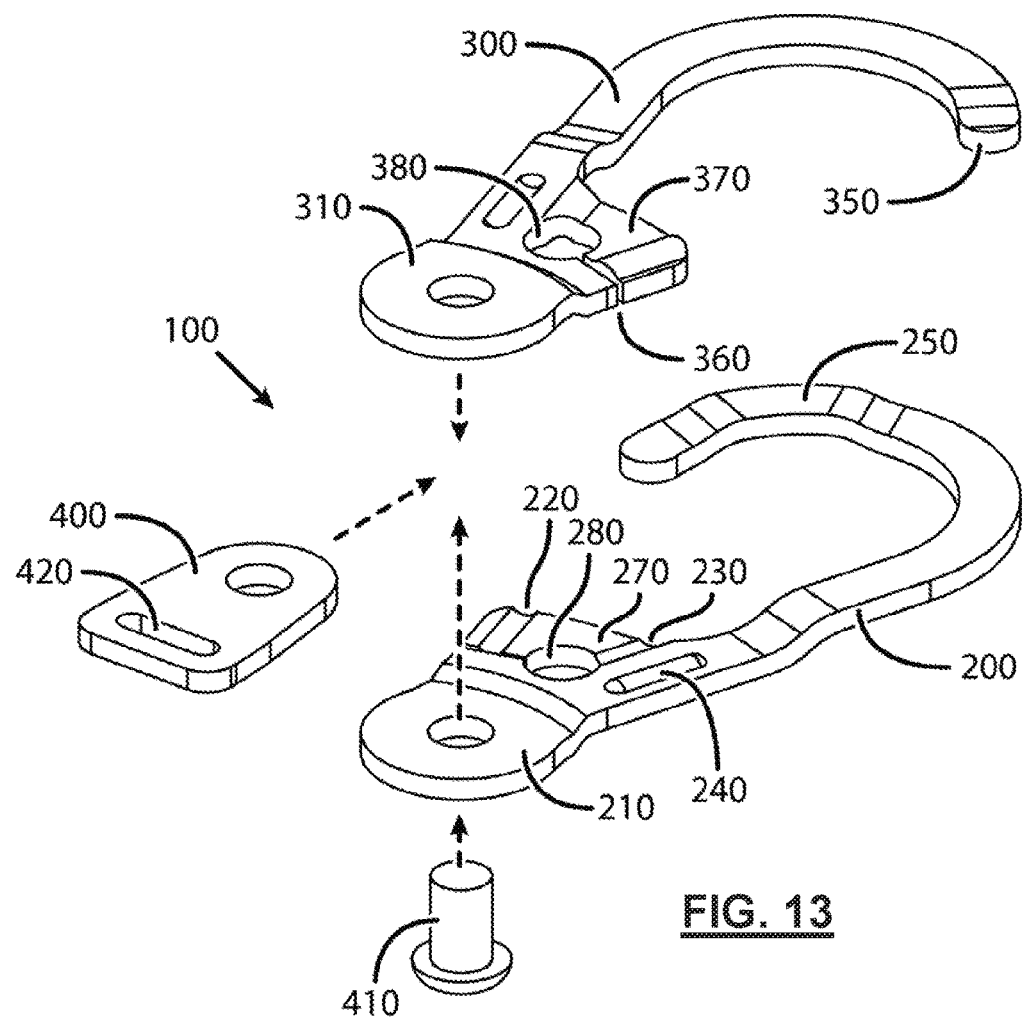
FIG. 13 shows an exploded perspective view of the third embodiment.

FIG. 12 shows a third embodiment of the hook assembly 100 that includes a yoke 400 that is secured to the deep hook 200 and to the shallow hook 300 by a bushing 410. FIG. 13 shows an exploded view of the hook assembly 100 before assembly. The bushing 410 may be a discrete component or it may be integrally formed onto the deep hook 200, the shallow hook 300, and/or the yoke 400. Similar to the first embodiment, the bushing 410 may be solid or hollow. If the bushing 410 is solid (as illustrated), the yoke 400 may include a hole 420 to receive a cord 500.

Figure 14:
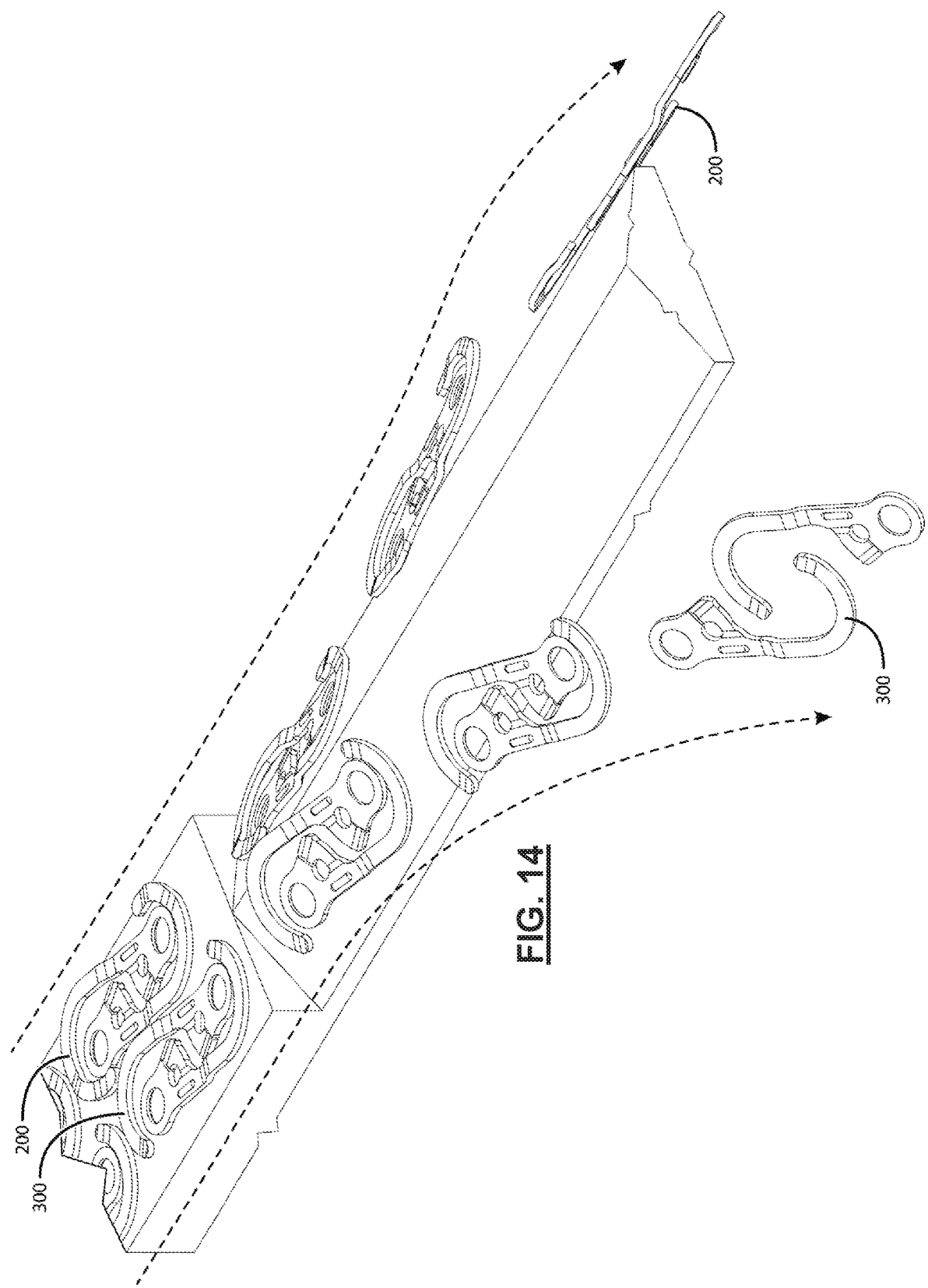
FIG. 14 shows a perspective view of how the hooks of the several embodiments may be nested for metal stamping and sorted after a final stamping operation.

FIG. 14 shows how the deep hook 200 and the shallow hook 300 may be nested in a manner suitable for production by progressive metal stamping and how the stamped hooks may be sorted after final stamping operation. Other means of manufacturing the deep hook 200 and the shallow hook 300 may include metal casting and/or plastic injection molding. For example, the deep hook 200 and the shallow hook 300 may be stamped from metal and then may be partially or completely coated with a hard nylon layer via plastic injection molding.

The foregoing embodiments are exemplary and should not be interpreted as limiting the scope of the present invention. Various implementations and combinations of these embodiments have been recognized and anticipated. A hook assembly may have greater or fewer retained configurations and may have greater or fewer retainers than has been illustrated in this disclosure. For example, there may only be a single retainer on a first hook that engages with a single embossment on a second hook to retain the hook assembly in a closed configuration. Further, the retainers and/or embossments may be disposed in various locations such as on each hook, on a yoke, on another member, or on some combination thereof. Additionally, the hooks may be formed into any shape that enables a grappling function, and the hooks may be formed from a substantially flat and/or round material. It is therefore intended that the appended claims cover all such embodiments that do not depart from the spirit and scope of the present invention.

What is claimed is:

1. A hook device comprising:
   (a) a bushing having a longitudinal axis perpendicular to a plane;
   (b) a first hook defining a first sleeve disposed below the plane rotatably connected to the bushing, a first shank defining a retainer 1A, and a first bend disposed above the plane; and
   (c) a second hook defining a second sleeve disposed above the plane rotatably connected to the bushing, a second shank defining a retainer 2A complimentary to the retainer 1A, and a second bend disposed below the plane facing opposite the first bend;
   (d) wherein the retainer 1A engages with the retainer 2A when the first bend substantially overlaps the second bend.

2. The hook device of claim 1 wherein the bend of the second hook is shorter than the bend of the first hook.

3. The hook device of claim 2 wherein a medial region of the first bend deviates above and away from the plane and a tip of the second bend deviates below and away from the plane.

4. The hook device of claim 3 wherein the bushing defines an axial bore adapted to receive a cord therethrough.

5. The hook device of claim 4 wherein the first shank defines a first through-hole that substantially overlaps a second through-hole defined on the second shank when the first bend substantially overlaps the second bend.

6. The hook device of claim 1 further comprising a retainer 1B defined on the first shank and a retainer 2B defined on the second shank complementary to the retainer 1B, wherein the retainer 1B engages with the retainer 2B when the first shank is adjacent to the second shank.

7. The hook device of claim 6 wherein the bend of the second hook is shorter than the bend of the first hook.

8. The hook device of claim 7 wherein a medial region of the first bend deviates above and away from the plane and a tip of the second bend deviates below and away from the plane.

9. The hook device of claim 8 wherein the bushing defines an axial bore adapted to receive a cord therethrough.

10. The hook device of claim 9 wherein the first shank defines a first through-hole that substantially overlays a second through-hole defined on the second shank when the first bend substantially overlaps the second bend.

11. A hook device comprising:
(a) a bushing having a longitudinal axis perpendicular to a plane;
(b) a first hook defining a first sleeve disposed below the plane rotatably connected to the bushing, a first shank defining a depression 1A, and a first bend disposed above the plane; and
(c) a second hook defining a second sleeve disposed above the plane rotatably connected to the bushing, a second shank defining an embossment 2A, and a second bend disposed below the plane facing opposite the first bend;
(d) wherein the depression 1A engages with the embossment 2A when the first bend substantially overlaps the second bend.

12. The hook device of claim 11 further comprising an embossment 1B defined on the first shank and a depression 2B defined on the second shank, wherein the embossment 1B engages with the depression 2B when the first shank is adjacent to the second shank.

13. The hook device of claim 12 wherein the bend of the second hook is shorter than the bend of the first hook.

14. The hook device of claim 13 wherein a medial region of the first bend deviates above and away from the plane and a tip of the second bend deviates below and away from the plane.

15. The hook device of claim 14 wherein the bushing defines an axial bore adapted to receive a cord therethrough.

16. The hook device of claim 15 wherein the first shank defines a first through-hole that substantially overlaps a second through-hole defined on the second shank when the first bend substantially overlaps the second bend.

17. A method of using a clasp having a first hook and an adjacent oppositely facing second hook, wherein the first hook has a sleeve rotatably coupled to an axle above a plane perpendicular to the axle and the second hook has a sleeve rotatably coupled to the axle below the plane, and further wherein the first hook has a bend below the plane and the second hook has a bend above the plane, comprising:
(a) engaging a first retainer defined on the first hook with a complementary second retainer defined on the second hook by rotating the first hook relative to the second hook until the first bend substantially overlaps the second bend.

* * * * *